No. 860,013. PATENTED JULY 16, 1907.
W. H. CHURCH.
FLEXIBLE SHAFTING.
APPLICATION FILED APR. 11, 1907.
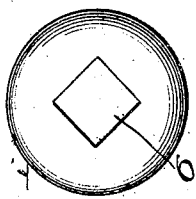
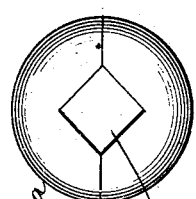
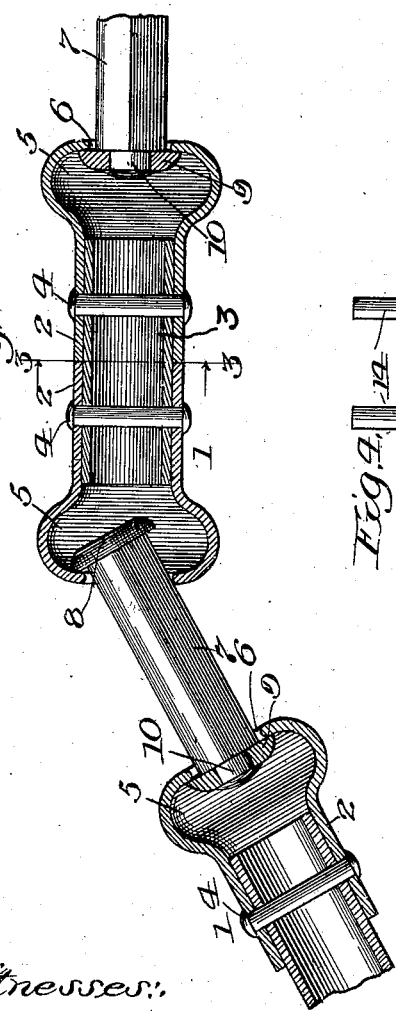
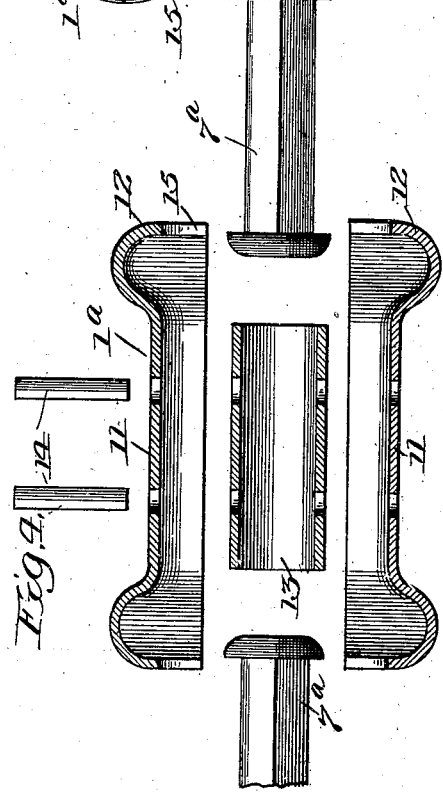
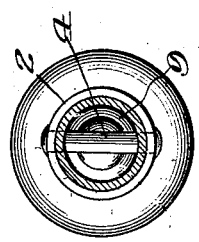
Witnesses:
Inventor
William H. Church
By Luther L. Miller, Atty

UNITED STATES PATENT OFFICE.

WILLIAM H. CHURCH, OF BELOIT, WISCONSIN.

FLEXIBLE SHAFTING.

No. 860,013.  Specification of Letters Patent.  Patented July 16, 1907.

Application filed April 11, 1907. Serial No. 367,700.

*To all whom it may concern:*

Be it known that I, WILLIAM H. CHURCH, a citizen of the United States, residing at Beloit, in the county of Rock and State of Wisconsin, have invented certain new and useful Improvements in Flexible Shafting, of which the following is a specification.

The object of this invention is to simplify the construction of flexible shafting and reduce the number of parts so as to decrease the cost of manufacture and lessen the liability to wear and breakage.

In the accompanying drawings Figure 1 is a longitudinal central section through several links of flexible shafting embodying the features of my invention. Fig. 2 is an end elevation of one of said links. Fig. 3 is a transverse sectional view taken on the plane of line 3 3 of Fig. 1. Fig. 4 is a longitudinal central section through an alternative form, the parts being separated to illustrate the construction. Fig. 5 is an end view of one of the links of said alternative construction.

Referring to Fig. 1, 1 indicates a link consisting of two sleeves 2 arranged, in this instance, to abut, said sleeves surrounding a member 3 which is preferably tubular as shown. The sleeves 2 and member 3 are secured together by means of rivets 4, the ends of the sleeves 2 extending beyond the ends of the member 3. Said projecting ends are enlarged to form sockets 5. In the outer end walls of the sockets 5 are formed non-circular or angular openings 6, which may be square as indicated in Fig. 2.

Adjacent links 1 of the shaft are flexibly connected together by means of links 7 in the form of pins having heads at their opposite ends adapted to lie loosely in the sockets 5. The links 7 preferably have a cross-sectional form corresponding to that of the openings 6, but are of less cross-sectional area than said openings. Upon one end of each of said links is formed a head 8 preferably integral with the link. Upon the opposite end of said link is a head 9 formed separate from the link, which head may consist of a washer inserted upon a stud 10 upon the end of said link, said stud being riveted to secure the washer in place.

In operation, power applied to any of the links 1 or 7 is transmitted to the adjacent links through the inter-engagement of the walls of the openings 6 with the links 7. Said openings being large enough to permit of a transverse or lateral movement of the links 7, the links 1 and 7 are permitted to arrange themselves at an angle with each other as indicated in Fig. 1.

The construction just described consists of seven pieces per pair of adjacent links. In Figs. 4 and 5 I have illustrated a construction in which the number of parts is reduced to six by making both heads of the link 7ª integral with the body of said link. To permit of connecting said link with the socket links 1ª I form said socket links of two semi-cylindrical sections 11 having socket-sections 12 at their opposite ends. Said semi-cylindrical link-sections are secured to an inner connecting member 13 by means of rivets 14 substantially as in the form first described. When the link-sections 11 are united the socket-sections 12 form between them angular openings 15 through which the links 7ª extend. The operation of the modified form of shafting is the same as that of the construction first set forth.

It is evident that various changes may be made in the embodiments herein shown without departing from the spirit and scope of my invention, therefore no undue limitation should be understood from the foregoing detailed description.

I claim as my invention:

1. Flexible shafting comprising a link having a socket in one end thereof, the end wall of said socket having a non-circular opening therein, and a link having a head lying within said socket and adapted to engage said end wall for preventing separation of said links, the body of said headed link being non-circular in cross-section and adapted to engage the non-circular walls of said opening, said link extending loosely and non-rotatably through said opening, and being longitudinally movable therein.

2. Flexible shafting comprising a link formed in sections; a member lying within said link sections; means for securing said link-sections to said member, said link having socket ends, said socket ends having non-circular openings therein, and links having heads lying in said sockets, the bodies of said last mentioned links being non-circular in cross-section and adapted to engage the walls of said openings.

3. Flexible shafting comprising a link formed in sections; a tube lying within said link-sections; rivets extending through said link-sections and said tube, said link having socket ends, said socket ends having non-circular openings therein, and links having heads lying in said sockets, said last mentioned links being adapted to engage the walls of said openings.

4. Flexible shafting comprising two semi-cylindrical link-sections; a member lying between said link sections; means for securing said link-sections and said member together, said link having socket ends, said socket ends having non-circular openings therein, and links having heads lying in said sockets, the bodies of said last mentioned links being non-circular in cross-section and adapted to engage the walls of said openings.

5. Flexible shafting comprising a link consisting of two semi-cylindrical link-sections; a member lying between said link-sections; means for securing said link sections and said member together, said link having socket ends and a non-circular opening in each end; and a link having an integral head at each end, the body of said link being non-circular in cross-section and adapted to engage the walls of said opening.

6. Flexible shafting comprising a link formed in sections; a member lying within said link sections; means for securing said link sections to said member, said link having socket ends, said socket ends having non-circular openings therein; and links having heads lying in said sockets, said links extending loosely and non-rotatably through said non-circular openings and being longitudinally movable therein.

7. Flexible shafting comprising a link formed in sections; a member lying within said link sections; means for securing said link sections to said member, said link having socket ends, the end walls of said sockets having non-circular openings therein; and links having heads lying in said sockets and adapted to engage said end walls for preventing separation of said links, the bodies of said headed links being non-circular in cross-section and adapted to engage the non-circular walls of said openings.

8. Flexible shafting comprising a link consisting of two semi-cylindrical link sections; a tube lying within said link sections; rivets extending through said link sections and said tube, said link having socket ends, said socket ends having non-circular openings therein; and links having heads lying in said sockets, the bodies of said last-mentioned links being non-circular in cross-section and adapted to engage the walls of said openings.

9. Flexible shafting comprising a link consisting of two semi-cylindrical link sections; a tube lying within said link sections; rivets extending through said link sections and said tube, said link having socket ends, the end walls of said socket ends having non-circular openings therein; and links having heads lying in said sockets and adapted to engage said end walls for preventing separation of said links, the bodies of said headed links being non-circular in cross-section and adapted to engage the non-circular walls of said openings, said headed links extending loosely and non-rotatably through said openings and being longitudinally movable therein.

WILLIAM H. CHURCH.

Witnesses:
F. F. LIVERMORE,
T. D. WOOLSEY.